Patented May 23, 1950

2,508,775

UNITED STATES PATENT OFFICE 2,508,775

PURIFICATION OF TITANIUM HALIDES

Holger Heinrich Schaumann, Newark, Del., assignor to E. I. du Pont de Nemours & Company, Wilmington, Del., a corporation of Delaware No Drawing. Application April 12, 1946, Serial No. 661,915

8 Claims. (Cl. 202—57)

This invention relates to the production of relatively pure titanium tetrahalides and more particularly to the purification and decolorization of titanium tetrachloride through the separation and removal of compounds of vanadium therefrom.

In pure state, titanium tetrachloride is a colorless, transparent, water-white liquid. As commonly prepared through the chlorination of titanium-bearing ores, such as ilmenite, rutile, etc., it is of more or less pronounced yellow color, depending on the manner of its preparation. When such titaniferous ores are chlorinated to obtain the tetrachloride, other volatile chlorides form simultaneously in the process which must be separated and removed before the relatively pure titanium compound can be obtained. Partial purification thereof can be accomplished by fractional distillation during which successful separation from compounds such as ferric chloride and silicon tetrachloride whose boiling points are sufficiently removed from that of titanium tetrachloride can be effected. Certain other chlorides present, particularly those of vanadium (a distilled titanium tetrachloride product from ilmenite chlorination will usually contain about 0.1% of vanadium) boil at temperatures too close to the boiling point of the titanium tetrachloride to permit of easy separation and removal by fractional distillation.

When titanium tetrachloride containing as little as .01% of vanadium impurity is employed in the preparation of pigment titanium dioxide, an undesired type of brown, discolored product results which is useless as a pigment. To insure production of a $TiO_2$ pigment possessing essential properties in respect to color and desired whiteness, removal of substantially all of the vanadium from the $TiCl_4$ is essential before it can be utilized for such purpose.

It is among the objects of this invention to overcome the above and other disadvantages which characterize prior methods for producing titanium tetrahalides and to provide in particular a novel method for effecting the purification of crude titanium tetrachloride to obtain a clear, water-white product useful for $TiO_2$ pigment production. A further object is to provide a novel method for effecting substantially complete separation of compounds of vanadium from titanium tetrachloride, and in such form as to be useful as a valuable by-product for industrial applications. Still further objects will appear from the ensuing description of the invention.

These objects are attainable in this invention which comprises contacting a titanium tetrahalide with an interstitial metal hydride, and thereafter separating and recovering the resulting purified tetrahalide from said hydride.

In a more specific and preferred embodiment, the invention comprises subjecting boiling or vaporized titanium tetrachloride, in the absence of moisture, to contact with titanium hydride and thereafter recovering the resulting purified chloride.

In adapting the invention in accordance with one preferred application thereof, crude, colored titanium tetrachloride containing about .1% of vanadium is boiled under refluxing conditions in the presence of a small amount, say, between about 1.5% and 5% by weight (based on the $TiCl_4$), of finely-divided titanium hydride for a sufficiently long period of time to effect conversion of the vanadium into a form easily separated, by distillation, from the titanium tetrachloride. Usually, the desired purification is effected after about three hours' boiling. After such treatment, the titanium tetrachloride is distilled from the resulting mixture in a conventional manner, as a result of which vanadium compounds formed during the treatment, together with the residue from the titanium hydride, are left behind. The resulting distillate is a relatively pure, water-white product which is substantially free from any vanadium impurities and well-suited for use in $TiO_2$ pigment preparation or any other industrial application where a relatively pure titanium tetrachloride is required.

In practicing the process, care must be taken to keep moisture out of the system because of the ease with which titanium tetrachloride hydrolyzes in its presence, and also because of its undesirable, deteriorating effect upon the titanium hydride treating agent. If appreciable amounts of free chlorine should be present in the crude titanium tetrachloride, it is desirable and preferable that it be predistilled before use to eliminate the chlorine, since otherwise the effectiveness of the titanium hydride becomes undesirably reduced and impaired.

Since the interstitial hydrides, such as titanium hydride, employed herein consist of a solid solution or an alloy of atomic hydrogen in the metal, it appears that when this hydrogen is removed from the hydride during the practice of the invention it emerges in the first place as an active form of atomic hydrogen. As a consequence, a very active reducing agent is provided which, it appears, accomplishes the objects of the invention by reducing vanadium compounds present to other compounds which are less volatile than the titanium tetrachloride, and from which the latter can be readily separated by fractional distillation. Since this takes place at relatively low temperatures, vanadium removal is accomplished by reduction without recourse to a high temperature conversion, which would exert a deleterious effect upon the character and type of tetrahalide ultimately recovered.

To a more complete understanding of the invention, the following example (wherein the parts mentioned are by weight) is given which is merely illustrative and not to be construed as in limitation of the invention:

Example 863 parts of yellow previously-distilled titanium tetrachloride containing .1% of vanadium, obtained from the chlorination of ilmenite ore, were placed in a distillation flask fitted with a reflux condenser. To the liquid was added 43 parts of finely-divided titanium hydride, 99 per cent of which passed through a 300 mesh screen. The liquid was boiled under reflux at atmospheric pressure for three and one-half hours. At the end of this time the reflux condenser was replaced with a distillation condenser, and titanium tetrachloride was distilled off. The resulting distillate was found to be water-white and was substantially free from vanadium.

While described above as applied to certain preferred adaptations, the invention is not, as already noted, limited thereto. As will be evident to those skilled in the art, variance therefrom may be resorted to without departing from its underlying principles and scope.

Thus, the above example describes the method for vanadium removal which comprises contacting titanium hydride with boiling titanium tetrachloride liquid but, alternatively, the invention may be practiced through contacting the titanium hydride with titanium tetrachloride vapors. This may be conveniently effected by passing the vaporized $TiCl_4$ through a conventional distillation column packed with the titanium hydride, either alone or on a suitable inert carrier. By maintaining a sufficiently large area of contact in the contacting agent, this method will prove at least as effective as that in which contacting the liquid $TiCl_4$ with the hydride is resorted to. Such vapor phase type of treatment is particularly desirable from the standpoint that it affords a continuous, as distinguished from a batch, type of operation.

The titanium hydride preferred for use herein does not have a fixed composition and hence in this sense may not be considered as a true compound. It is often considered, however, as an alloy of titanium with hydrogen. It is conveniently and customarily prepared by heating metallic titanium to about 900° C. and then cooling the same in an atmosphere of hydrogen. Its resulting composition is approximately 96.5% by weight titanium and 3.5% hydrogen which corresponds to the atomic proportions of 1 to 1.73. The amount of hydrogen present, however, varies somewhat, depending on the method of preparation. Accordingly, the invention is not to be taken as limited to the use of titanium hydride having precisely this composition, but includes combinations of titanium and hydrogen containing from about one to about four per cent hydrogen by weight. Similarly, the amount of titanium or other metal hydride used herein may range from, say, 1% to 10% by weight, based on the tetrahalide treated.

As already indicated, other metal hydrides than the preferred titanium hydride are also contemplated for use in the invention. Hydrides found most effective for use comprise the so-called "interstitial hydrides" of metals from groups IV and V of the periodic table selected from the group consisting of titanium, zirconium, hafnium, thorium, columbium, tantalum, cerium, lanthanum and palladium. These interstitial hydrides are characterized by metallic appearance and properties, and their compositions vary depending on their mode of formation and previous history. The molecular ratios of metal to hydrogen in the normal condition in these hydrides are generally not whole numbers. For example, the most usual compositions of thorium, zirconium, titanium and tantalum hydrides contain, respectively, 3.07, 1.92, 1.73 and 0.76 molecules of hydrogen for each molecule of metal. Hence, the contemplated hydrides are distinctly different, both in composition and properties, from either the salt-like hydrides, such as the alkali metal hydrides which are true crystalline compounds of fixed composition, or the gaseous hydrides, such as those of carbon, silicon, germanium, tin, phosphorus, arsenic, etc., which are also true compounds.

While the invention is particularly and preferably adapted for titanium tetrachloride treatment, it is also applicable to the treatment of other titanium halides, including those of bromine, iodine and fluorine.

I claim as my invention:

1. A method for treating a titanium tetrahalide to effect purification thereof which comprises contacting said halide with titanium hydride, and thereafter separating and recovering the resulting purified titanium tetrahalide from said hydride.

2. A method for treating a titanium tetrahalide to effect purification thereof which comprises distilling said halide over titanium hydride, and thereafter separating and recovering the resulting purified titanium tetrahalide from said hydride.

3. A method for treating titanium tetrachloride to effect purification thereof which comprises boiling said chloride in the presence of a small amount of a titanium hydride, and thereafter separating and recovering the resulting purified titanium tetrachloride from said hydride.

4. A method for treating titanium tetrachloride to effect purification thereof which comprises boiling said chloride in the presence of from 1% to 10% by weight, based on said tetrachloride, of a titanium hydride, and thereafter separating and recovering the resulting purified titanium tetrachloride from said hydride.

5. A method for treating titanium tetrachloride to effect purification thereof which comprises boiling said chloride in the presence of from 1.5% to 5% by weight, based on said tetrachloride, of a titanium hydride, and thereafter separating and recovering the resulting purified titanium tetrachloride from said hydride.

6. A method for purifying a titanium tetrachloride solution to effect vanadium removal therefrom, comprising, in a moisture-free system, adding finely-divided titanium hydride in an amount ranging from 1% to 10%, by weight, based on the $TiCl_4$, to said solution, boiling the resulting mixture under reflux and at atmospheric pressure for about three and one-half hours, and then distilling off and condensing the $TiCl_4$ from the reflux condensate to recover the purified titanium tetrachloride.

7. A method for purifying a vanadium-contaminated titanium tetrachloride solution to effect removal of said vanadium impurity, comprising, in a moisture-free system, adding finely-divided titanium hydride, in an amount ranging from 1.5% to 5%, by weight, based on the TiCl₄, to said solution, subjecting the resulting mixture to boiling under refluxing conditions and at atmospheric pressure for a period of about three and one-half hours, and thereafter distilling off the titanium tetrachloride from the reflux condensate and condensing the resulting vapors to recover the purified TiCl₄.

8. A method for purifying titanium tetrachloride to effect vanadium removal therefrom which comprises contacting said tetrachloride at its boiling temperature with titanium hydride and thereafter separating and recovering the resulting purified titanium tetrachloride from said hydride.

HOLGER HEINRICH SCHAUMANN.

No references cited.